Dec. 26, 1967     J. H. CARTER     3,360,300

TOY TIRE WITH WHITE SIDE WALL INSERT RING

Filed Oct. 22, 1965

INVENTOR
JOSEPH H. CARTER

ATTORNEY

United States Patent Office 3,360,300
Patented Dec. 26, 1967

3,360,300
TOY TIRE WITH WHITE SIDE WALL INSERT RING
Joseph H. Carter, Rockford, Ill., assignor to Carter Machine & Tool Co., Rockford, Ill., a corporation of Illinois
Filed Oct. 22, 1965, Ser. No. 502,080
12 Claims. (Cl. 301—63)

ABSTRACT OF THE DISCLOSURE

The present toy vehicle wheel has a black rubber tire molded integral with the disk wheel and hub, and is designed so that the hub cap, which can be snapped into place in a central recess around the hub, before a molded white rubber or plastic insert ring is snapped into place in an annular opening provided in the outer side of the tire, in concentric relation to the aforesaid recess, is thereby placed in mutually retaining relationship to the insert ring.

---

This invention relates to a new and improved three-piece white side wall tire construction for toy vehicles.

White side wall tires for toy vehicles as now available do not simulate the latest designs of white side wall tires for automobiles closely enough because the width of white side wall is too large, and it is therefore the principal object of my invention to remedy this by providing a relatively narrow snap-in ring of white rubber or plastic that is easily insertable in an annular groove provided therefor, one side of the tire being so conformed externally and internally with respect to an annular groove for the ring to enable snapping in the metal hub cap first and then the rubber side wall insert ring, the cap and ring being then in mutual supporting relationship to one another.

The invention is illustrated in the accompanying drawing, in which.

The same reference numerals are applied to corresponding parts throughout the views.

Figure 1:
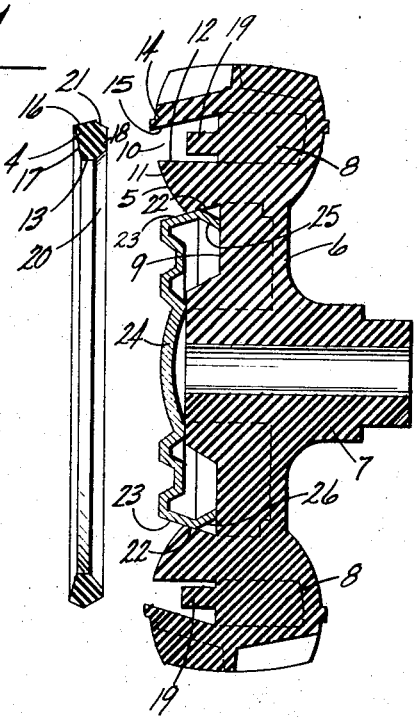
FIG. 1 is a cross-section on the line 1—1 of FIG. 3 of a toy tire constructed in accordance with my invention showing the hub cap already snapped into place and the white side wall ring in section about to be pressed into place.
Figure 2:
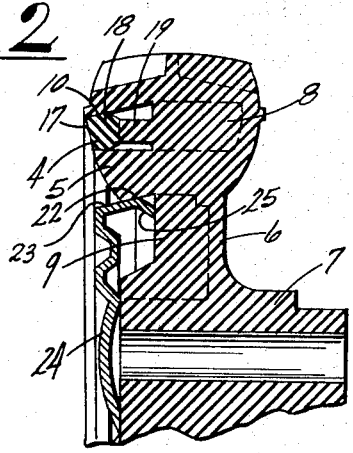
FIG. 2 is a partial section like FIG. 1 but showing the assembly completed with the white side wall ring inserted.
Figure 3:
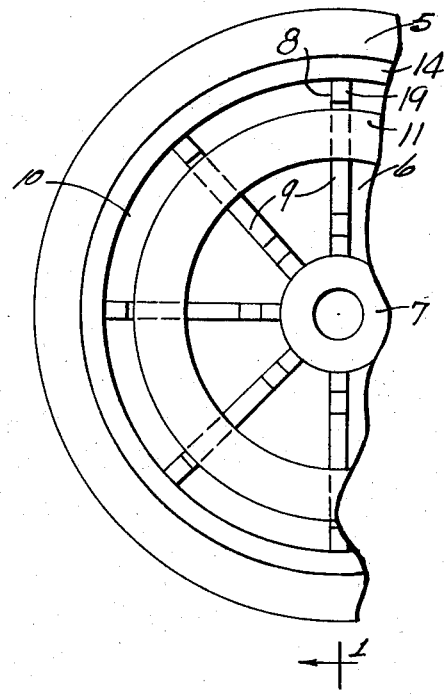
FIG. 3 is a partial side view of the tire with the hub cap and white side wall ring omitted.

The way toy vechile tires have been made, the white side wall is generally far too wide in relation to what is now considered good design in automobile tires. In some cases the white side wall was provided as an integral part of the hub cap that was snapped into place in the side of the black rubber molded tire body, but, in accordance with the present invention, I provide a molded rubber or white plastic side wall ring 4 of approximately the correct radial width in relation to the radial dimension of the side of the black molded rubber tire 5 that is here shown as molded integral with the disk wheel 6 and hub 7. The tire 5 is hollow except for integral radial webs 8 at regularly spaced intervals circumferentially of the tire, as seen in FIG. 3, the locations of these webs coinciding with radial spoke ribs 9 in the disk wheel portion 6 between the hub portion 7 and tire portion 5. The outer side wall of the hollow tire 5 is open annularly as appears at 10 in FIGS. 1 and 3 to accommodate the insert ring 4, which, as previously stated, is of molded white rubber or plastic material to contrast nicely with respect to the black molded rubber of the tire 5. The annular opening 10 in the side wall is defined by a radially inner annular wall 11, the radially outer periphery 12 of which is normal to the plane of the tire and coincides with the radially inner periphery 13 of the insert ring 4 and of the same radius, the surface 13 being normal to the plane of the ring 4. The radially outer annular wall 14 of the tire 5 has its radially inner periphery 15 in outwardly converging relation to the periphery 12 of the inner annular wall 11 and of the same radius as and inclined corresponding to the inclination of the radially outer periphery 16 of the ring 4. The outer or front face 17 of the ring 4 is inclined radially inwardly same as and lies substantially flush with the outer surface of the tire 5 when the ring 4 is assembled in the tire, as seen in FIG. 2, with the flat inner or rear face 18 disposed in abutment with outwardly projecting lugs 19 provided on the webs 8 previously mentioned. The ring 4 is beveled circumferentially on the inner or rear side as indicated at 20 and 21 for wedging engagement in the annular opening 10 of the tire 5 to spread the outer peripheral wall 14 radially in relation to the inner peripheral wall 11 when inserting the ring 4 in the tire, the ring snapping in place once the radially outer inclined periphery 16 gets inside the correspondingly inclined wall 15 and the ring 4 is part-way home.

The radially inner periphery 22 of the tire 5 is of decreasing radius outwardly from the spokes 9, matching both the radius and the inclination of the flange 23 on the outer periphery of the hub cap 24. The cap 24, which may be of either metallic construction or molded plastic material, has an inner edge portion 25 on the flange 24 of inwardly converging or bevelled form, so that the cap can be snapped into place readily before the white side wall ring 4 is inserted, the bevelled surface defined by the edge portion 25 having wedging engagement inside the flexible inner portion 11 of the tire 5 to spread it radially enough to permit the hub cap 24 to be snapped into place. Thereafter, in assembling the white side wall ring 4 in the open side 10 of the tire 5 the outer annular portion 14 of the tire is spread radially in relation to the inner annular portion 11 enough to permit the ring 4 to be snapped into place. Once the white side wall ring 4 has been inserted, there is no danger of its ever coming out because the cap 24 and ring 4 actually serve to lock one another in place.

In operation, the hub cap 24 is inserted first, the inner annular portion 11 of the tire 5 being easily expanded radially to the extent necessary to allow the rim portion 23–25 of the hub cap to be snapped into place. Then the white side wall ring 4 is pressed into place, the bevelled edges 20–21 causing a certain amount of radial compression of the inner annular portion 11 of the tire 5 as well as radial expansion of the ring 4 while the outer annular portion 14 of the tire 5 is expanded radially to the extent necessary to allow the ring 4 to be entered and snapped into place in abutment with the lugs 19 on the webs 8. Thus the cap 24 and ring 4 serve to lock one another securely in place, and the resulting construction is in appearance a miniature of the latest designs of automobile tires with narrow white side wall, the white side wall being narrow and in the correct width relationship to the rest of the tire and in the proper radially spaced relation to the hub cap as on full size automobile tires of latest design. The web portions 8 serve to resist expansion of the tire 5 and in that way make for more secure lockup of the ring 4, besides serving as abutments at 19 for the ring to keep it in flush relationship to the outside of the tire. The spoke portions 9 serve in a somewhat similar capacity in relation to the hub cap 24.

It is believed the foregoing description conveys a good understanding of the objects and advantages of my invention. The appended claims have been drawn to cover all legitimate modifications and adaptations.

I claim:

1. In a wheel for a toy vehicle, a wheel body having a concentric peripheral tire having an annular opening provided in the outer side thereof in concentric relation to said tire, said annular opening being defined by a radially outer annular wall both and a radially inner annular wall flexible relative to the rest of said tire, said radially inner annular wall having an annular recess defined thereon on its radially inner side in concentric relation to said tire, a hub cap having an annular rim portion entered in said annular recess under axial pressure on said hub cap in which the radially inner annular wall of said tire is subjected to radial expansion, and a white side wall ring entered in said annular opening, its entry requiring application of pressure axially on said ring, during which the radially inner annular wall of said tire is subjected to a certain amount of compression radially while the radially outer wall of said tire is subjected to radial expansion.

2. A toy vehicle wheel construction as set forth in claim 1 wherein said hub cap rim portion is bevelled on the inner side for wedging engagement with the radially inner circumference of the radially inner wall of the said tire to subject said radially inner wall of said tire to expansion radially while said hub cap is being pressed into place.

3. A toy vehicle wheel construction as set forth in claim 1 wherein said hub cap rim portion is bevelled on the inner side for wedging engagement with the radially inner circumference of the radially inner wall of the said tire to subject said radially inner wall of said tire to expansion radially while said hub cap is being pressed into place, the rim portion of said hub cap also including an oppositely bevelled portion which by engagement with the radially inner wall of said tire serves to retain said hub cap in place.

4. A toy vehicle wheel construction as set forth in claim 1 wherein said white side wall ring is bevelled on its inner side for wedging engagement in the annular opening in said tire when said ring is subjected to axial pressure in the entry thereof in said annular opening whereby to spread said opening sufficiently to admit the ring.

5. A toy vehicle wheel construction as set forth in claim 1 wherein said white side wall ring is bevelled on its inner side for wedging engagement in the annular opening in said tire when said ring is subjected to axial pressure in the entry thereof in said annular opening whereby to spread said opening sufficiently to admit the ring, said ring having an oppositely bevelled portion which after the ring is entered in said opening serves by engagement with the adjacent side of the opening in said tire portion to retain said ring in place.

6. A toy vehicle wheel construction as set forth in claim 1 wherein said white side wall ring is tapered on its inner side for wedging engagement in the annular opening in said tire to facilitate spreading of said annular opening to admit said ring.

7. A toy vehicle wheel construction as set forth in claim 1 wherein said white side wall ring is tapered on its inner side for wedging engagement in the annular opening in said tire to facilitate spreading of said annular opening to admit said ring, said ring having the outer portion thereof provided with an opposite taper whereby to retain said ring in place in said opening under radial expansion of the radially inner annular wall of said tire and radial compression of the radially outer annular wall of said tire.

8. A toy vehicle wheel comprising a wheel body having a tire portion in concentric relation thereto having an annular opening in one side thereof concentric therewith, a white side wall ring insert entered in and substantially filling said annular opening in concentric relation to said tire portion, entry of said ring necessitating a certain amount of radial compression of the radially inner annular portion of said tire and a certain amount of radial expansion of the radially outer annular portion of said tire on opposite sides of said annular opening, and a hub cap mounted on said wheel in radially spaced concentric relation to said ring having its peripheral portion surrounded by the radially inner annular portion of said tire and held in place by the radial compression of the latter, whereby said ring and hub cap are in mutually retaining relationship to one another.

9. In a wheel for a toy vehicle, a wheel body having a concentric peripheral tire having an annular opening provided in the outer side thereof in concentric relation to said tire, said annular opening being defined by a radially outer annular wall and a radially inner annular wall both flexible relative to the rest of said tire, said tire being hollow annularly except for radially extending web portions at circumferentially spaced intervals which yieldingly and resiliently resist spreading of said annular opening, a white side wall ring entered in said annular opening in abutment with said web portions for support against inward displacement relative to the side of said tire, said ring being retained against outward displacement by frictional engagement with the annular walls on opposite sides of said annular opening, and a hub cap mounted on said wheel having its peripheral portion frictionally held by abutment inside the radially inner annular wall of said tire, whereby said ring and cap are in mutually retaining relationship to one another.

10. In a wheel for a toy vehicle, a wheel body having a concentric peripheral tire, the wheel body having a disk portion with radial spoke portions projecting from one side thereof between said tire and a central hub, said tire providing relatively radially flexible resilient annular inner and outer walls projecting from the same side of said wheel as said spokes and defining an annular opening between and in concentric relation to said inner and outer walls, a hup cap applied to said wheel enclosing said hub and having a peripheral flange portion abutting the radially outer end portions of said spokes to prevent inward displacement of said hub cap while the inner wall of said tire serves by frictional engagement with the peripheral portion of said hub cap to prevent outward displacement thereof, and a white side wall ring insert entered in said annular opening and retained against outward displacement by frictional engagement on radially opposite sides with adjacent sides of both of said walls on the radially inner and radially outer sides of said annular opening whereby the ring and hub cap are in mutually retaining relationship.

11. In a wheel for a toy vehicle, a wheel body having a concentric peripheral tire, the wheel body having a disk portion with radial spoke portions projecting from one side thereof between said tire and a central hub, said tire projecting from the same side of said wheel as said spokes, a hub cap applied to said wheel enclosing said hub and having a peripheral flange portion abutting the radially outer end portions of said spokes to prevent inward displacement of said hub cap while the annularly projecting portion of said tire serves by frictional engagement with the peripheral portion of said hub cap to prevent outward displacement thereof, said tire having an annular opening provided in the outer side thereof in concentric relation to said tire and hub cap, and a white side wall ring insert entered in said annular opening and retained against outward displacement by frictional engagement with the radially inner and radially outer sides of said annular opening, said tire being hollow except for radial web portions in circumferentially spaced relation in inwardly spaced relation to the open side of said tire, said web portions resiliently resisting spreading of the annular opening to admit said ring and providing spaced abutments for backing up said ring to limit inward displacement thereof relative to said opening.

12. A vehicle wheel comprising a one piece wheel body of resilient material having a central circular recess in the outer side to receive a hub cap and having a resilient tire portion in concentric relation to and forming a wall surounding said central hub cap recess, said tire portion having an annular opening in the outer side thereof in radially spaced concentric relation to said recess and defining radially flexible inner and outer annular portions, a hub cap press-fitted in said recess so as to be retained by the radially inner annular portion of said tire portion, and a white side wall ring insert of larger diameter than said hub cap entered with a press fit in and substantially filling said annular opening, whereby the radially flexible inner and outer annular portions of said tire portion are spread apart and the ring insert and hub cap are assembled in mutually retaining relationship to one another.

References Cited

UNITED STATES PATENTS

| | | | |
|---|---|---|---|
| 2,701,601 | 2/1955 | Sutter | 152—388 |
| 2,940,781 | 6/1960 | Erikson. | |
| 3,048,447 | 8/1962 | Klint | 301—63 |
| 3,258,050 | 6/1966 | Nonnamaker | 152—353 |

OTHER REFERENCES

Schoeps—German Printed App. 1,079,980, April 1960.

RICHARD J. JOHNSON, *Primary Examiner.*

BENJAMIN HERSH, *Examiner.*